(12) United States Patent
Liu (10) Patent No.: US 11,572,910 B2
(45) Date of Patent: Feb. 7, 2023

(54) FASTENER STRUCTURE

(71) Applicants: LITE-ON ELECTRONICS (GUANGZHOU) LIMITED, Guangzhou (CN); Lite-On Technology Corporation, Taipei (TW)

(72) Inventor: Chen-Yuan Liu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 374 days.

(21) Appl. No.: 16/921,890

(22) Filed: Jul. 6, 2020

(65) Prior Publication Data
US 2021/0381534 A1    Dec. 9, 2021

(30) Foreign Application Priority Data
Jun. 4, 2020    (TW) ................................. 109118761

(51) Int. Cl.
*F16B 5/02*    (2006.01)
*F16B 5/07*    (2006.01)
*E05C 3/04*    (2006.01)

(52) U.S. Cl.
CPC ............ *F16B 5/0258* (2013.01); *E05C 3/045* (2013.01); *F16B 5/07* (2013.01)

(58) Field of Classification Search
CPC ......... Y10T 292/0911; Y10T 292/0945; Y10T 292/0926; Y10T 292/0928; Y10T 292/0933; Y10T 292/1043; Y10T 292/1051; Y10T 292/1052; Y10T 292/106; E05C 3/045; E05C 3/00; E05C 3/12; E05C 3/22; E05C 3/24; E05C 19/10; E05C 19/12; F16B 5/0258; F16B 5/07; Y10S 292/37; Y10S 292/11
See application file for complete search history.

(56) References Cited

U.S. PATENT DOCUMENTS

| | | | | |
|---|---|---|---|---|
| 37,567 A | * | 2/1863 | Cooper | ...................... E05C 3/30 292/127 |
| 312,859 A | * | 2/1885 | Jennings | ................... E05C 3/30 292/127 |

(Continued)

FOREIGN PATENT DOCUMENTS

WO    WO-2006096600 A2 * 9/2006 ............. E05B 83/30

OTHER PUBLICATIONS

"Office Action of China Counterpart Application", dated Oct. 8, 2022, p. 1-p. 11.

*Primary Examiner* — Christine M Mills
*Assistant Examiner* — Steven A Tullia
(74) *Attorney, Agent, or Firm* — JCIPRNET (57) ABSTRACT

A fastener structure is provided, including a hollow sleeve, a rod body, and a hook assembly. The hollow sleeve is assembled on a first plate, and the rod body is inserted into the hollow sleeve. The hook assembly is rotatably assembled on the first plate, and includes a hook component and an elastic component. The hook component is adapted for being fastened to a positioning opening portion of a second plate, where a first side of the rod body is adapted to lean against the hook component. A first end of the elastic component leans against the first plate, and a second end of the elastic component is fixed on the hook component.

19 Claims, 12 Drawing Sheets

(56) References Cited

U.S. PATENT DOCUMENTS

| | | | | |
|---|---|---|---|---|
| 349,671 A * | 9/1886 | Swartzwelder | E05C 3/30 292/DIG. 37 |
| 848,034 A * | 3/1907 | Husemann | E05B 47/0002 292/108 |
| 991,959 A * | 5/1911 | Dickert et al. | E05C 3/30 49/67 |
| 1,055,613 A * | 3/1913 | Connor | E05B 53/001 292/DIG. 56 |
| 1,185,422 A * | 5/1916 | Mammelli | E05C 3/124 292/254 |
| 1,318,287 A * | 10/1919 | Kelly | E05C 3/30 292/127 |
| 1,661,548 A * | 3/1928 | Stuart | E05C 3/30 292/127 |
| 1,662,255 A * | 3/1928 | Stuart | E05C 3/30 292/127 |
| 1,703,556 A * | 2/1929 | Stewart | E05C 3/30 292/127 |
| 1,805,789 A * | 5/1931 | Stuart | E05C 3/30 292/127 |
| 2,313,712 A * | 3/1943 | Jacobi | E05B 83/30 70/451 |
| 3,319,918 A * | 5/1967 | Rapata | F16B 37/043 267/141 |
| 3,339,956 A * | 9/1967 | Bencene | E05C 3/30 292/127 |
| 3,794,365 A * | 2/1974 | Richberg | E05B 65/1033 292/62 |
| 3,869,160 A * | 3/1975 | Fletcher | E05C 19/10 292/108 |
| 4,208,837 A * | 6/1980 | Black, Sr. | E05B 65/1033 292/216 |
| 5,178,433 A * | 1/1993 | Wagner | F16F 1/44 403/224 |
| 5,864,529 A | 1/1999 | Liao et al. | |
| 6,048,001 A * | 4/2000 | Miller | E05C 3/24 292/220 |
| 6,069,790 A * | 5/2000 | Howell | H01R 13/62933 439/155 |
| 6,811,119 B1 * | 11/2004 | Petersen | E05B 65/006 244/114 R |
| 6,951,318 B1 * | 10/2005 | Petersen | E05C 3/16 244/114 R |
| 7,261,332 B1 * | 8/2007 | Petersen | E05B 15/021 292/121 |
| 2008/0278043 A1 * | 11/2008 | Holcomb | E05B 65/46 312/219 |
| 2015/0117050 A1 * | 4/2015 | Burton | B60Q 1/2638 29/525.01 |
| 2016/0262280 A1 * | 9/2016 | Müller | H05K 7/142 |
| 2016/0319577 A1 * | 11/2016 | Liang | E05C 3/14 |
| 2018/0094667 A1 * | 4/2018 | Clark | F16B 21/06 |

\* cited by examiner

FASTENER STRUCTURE

CROSS-REFERENCE TO RELATED APPLICATION

This application claims the priority benefit of Taiwan application serial no. 109118761, filed on Jun. 4, 2020. The entirety of the above-mentioned patent application is hereby incorporated by reference herein and made a part of this specification.

BACKGROUND OF THE INVENTION

1. Field of the Invention

The invention relates to a fastener structure, and in particular, to a fastener structure that may provide a conveniently detachable connection manner.

2. Description of Related Art

At present, two plates are mainly assembled in a screw locking manner. However, the screw locking manner causes great inconvenience in assembly and operation, and it takes a lot of time and labor in disassembly and assembly. In short, the screw locking manner is not extremely adapted for a present trend of tool-less disassembly.

SUMMARY OF THE INVENTION

The invention provides a fastener structure, which may assemble or disassemble two plates quickly in a tool-less manner.

The fastener structure of the invention is configured to detachably assemble a first plate on a second plate. The fastener structure includes a hollow sleeve, a rod body, and a hook assembly. The hollow sleeve is assembled on the first plate. The rod body is inserted into the hollow sleeve and adapted for moving between a first position and a second position along an axis. The hook assembly is rotatably assembled on the first plate, and includes a hook component and an elastic component. The hook component is adapted for being fastened to a positioning opening portion of a second plate, where a first side of the rod body is adapted to lean against the hook component. The elastic component has a first end and a second end opposite to each other. The first end leans against the first plate, and the second end is fixed on the hook component. When the rod body is located at the first position, the hook component is fastened to the positioning opening portion of the second plate. When the rod body moves from the first position to the second position, the rod body pushes against the hook component to rotate the hook component to be separated from the positioning opening portion of the second plate, and the elastic component is elastically deformed, an elastic restoring force of the elastic component drives the hook component to restore.

In an embodiment of the invention, the hollow sleeve includes a first fastening portion, and the rod body includes a second fastening portion. The first fastening portion is fastened to the second fastening portion to restrict relative movement between the rod body and the hollow sleeve.

In an embodiment of the invention, one of the first fastening portion and the second fastening portion is a fixture block, and the other of the first fastening portion and the second fastening portion is a slot.

In an embodiment of the invention, the rod body has the first side and a second side opposite to each other, and the second fastening portion is closer to the first side relative to the second side.

In an embodiment of the invention, the rod body has the first side and a second side opposite to each other and includes a fastening component. The fastening component is disposed on the second side and is adapted to fasten one side of the hollow sleeve.

In an embodiment of the invention, the fastening component is a fixture block.

In an embodiment of the invention, the hollow sleeve has a plurality of locking holes, a plurality of locking components are adapted to respectively pass through the locking holes to lock the hollow sleeve on the first plate.

In an embodiment of the invention, the hollow sleeve has a guide hole, two opposite ends of a guide component are respectively adapted to pass through the guide hole and lock on a fixing base of the second plate.

In an embodiment of the invention, the rod body includes a body and a leaning portion, the leaning portion is connected to the body and protrudes from a side edge of the body, and the leaning portion is adapted for leaning against the hook component.

In an embodiment of the invention, the hook component has a leaning surface, and the leaning portion has an inclined surface, a part of the inclined surface is adapted for directly leaning against the leaning surface.

In an embodiment of the invention, the hook component includes a first hook portion and a second hook portion. The first hook portion is adapted for being fastened to the positioning opening portion of the second plate. A second end of the elastic component is fixed on the second hook portion.

In an embodiment of the invention, the hook component has an assembly hole, and the hook assembly further includes a fixing sleeve and a locking component. The fixing sleeve is assembled on the first plate and passes through the assembly hole of the hook component. The elastic component is sleeved on the fixing sleeve. The locking component is locked in the fixing sleeve and leans against the hook component.

In an embodiment of the invention, the fixing sleeve includes a fixing portion, a disposing portion, and a sleeving portion. The fixing portion is fixed on the first plate. The disposing portion is connected to the fixing portion, the elastic component being sleeved on the disposing portion. The elastic component is located between the fixing portion and the hook component. The sleeving portion is connected to the disposing portion and passes through the assembly hole of the hook component. The disposing portion is located between the fixing portion and the sleeving portion, and the locking component is locked in the sleeving portion.

In an embodiment of the invention, a first outer diameter of the fixing portion is larger than a second outer diameter of the disposing portion. The second outer diameter of the disposing portion is larger than a third outer diameter of the sleeving portion.

In an embodiment of the invention, the fixing portion, the disposing portion, and the sleeving portion are integrally formed.

In an embodiment of the invention, a length of the fixing sleeve is greater than a length of the locking component.

In an embodiment of the invention, the locking component includes a screw or a bolt.

In an embodiment of the invention, the elastic component includes a spring or a torsion spring.

In an embodiment of the invention, a length of the rod body is greater than a length of the hollow sleeve.

In an embodiment of the invention, the first plate includes a bent portion, the second plate includes a fixing plate, and the fixing plate includes the positioning opening portion. The first end of the elastic component leans against the bent portion. When the rod body is located at the first position, the bent portion leans against the fixing plate, and the hook component is fastened to the positioning opening portion.

Based on the foregoing, in the design of the fastener structure of the invention, the rod body is inserted into the hollow sleeve and is adapted for moving between the first position and the second position along the axis to apply or not apply a force to the hook assembly, thereby assembling or disassembling the first plate on the second plate. In short, the fastener structure of the invention quickly assembles or disassembles the first plate and the second plate depending on structural interference, and has characteristics of simple operation and tool-less mounting. In addition, the fastener structure of the invention has the advantages of simple design and a simple structure.

To make the features and advantages of the invention clear and easy to understand, the following gives a detailed description of embodiments with reference to accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
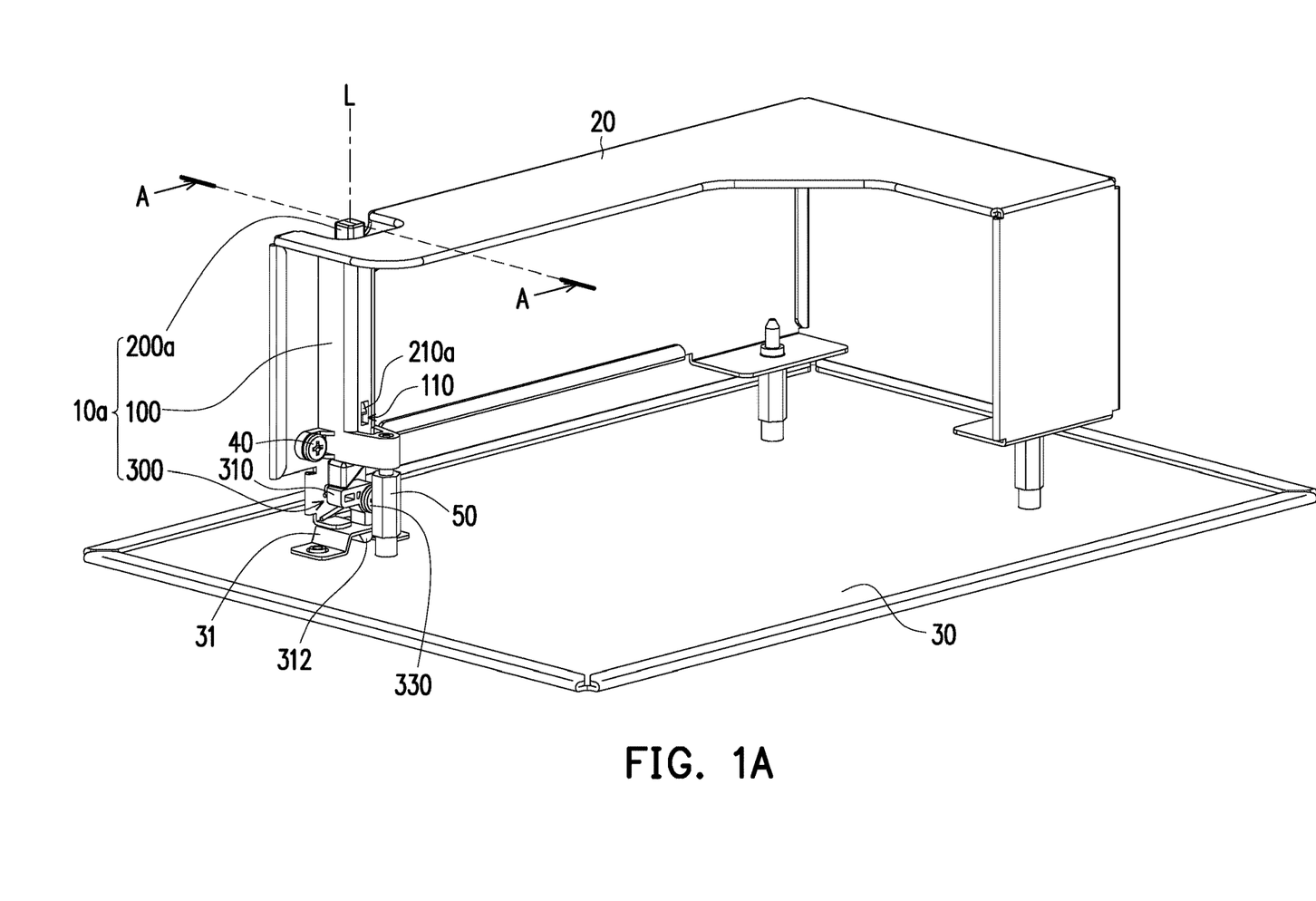
FIG. 1A is a schematic three-dimensional diagram of assembling a first plate on a second plate according to a fastener structure of an embodiment of the invention.
Figure 1B:
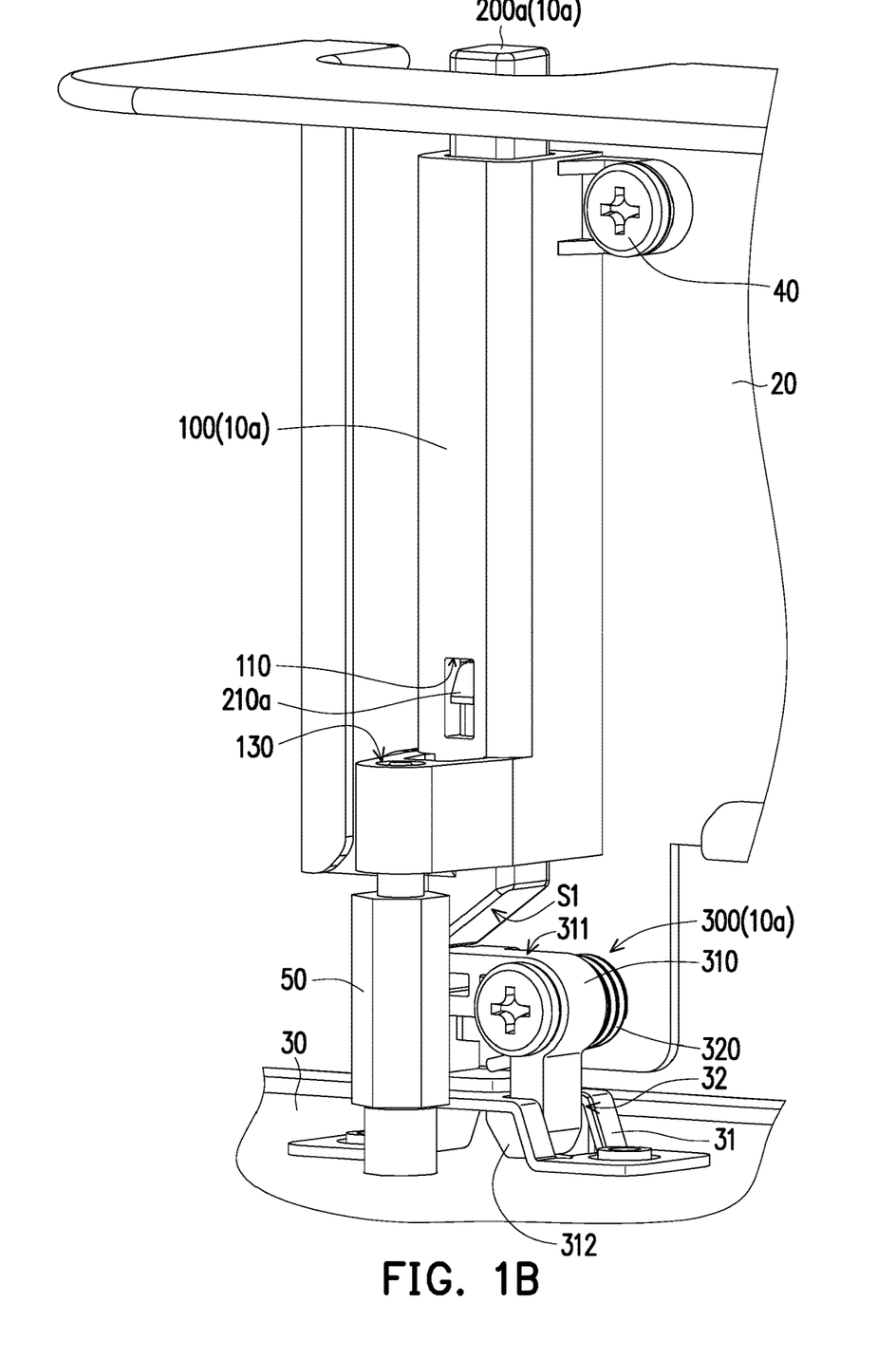
FIG. 1B is a schematic partial three-dimensional diagram of FIG. 1A from another perspective.
Figure 1C:
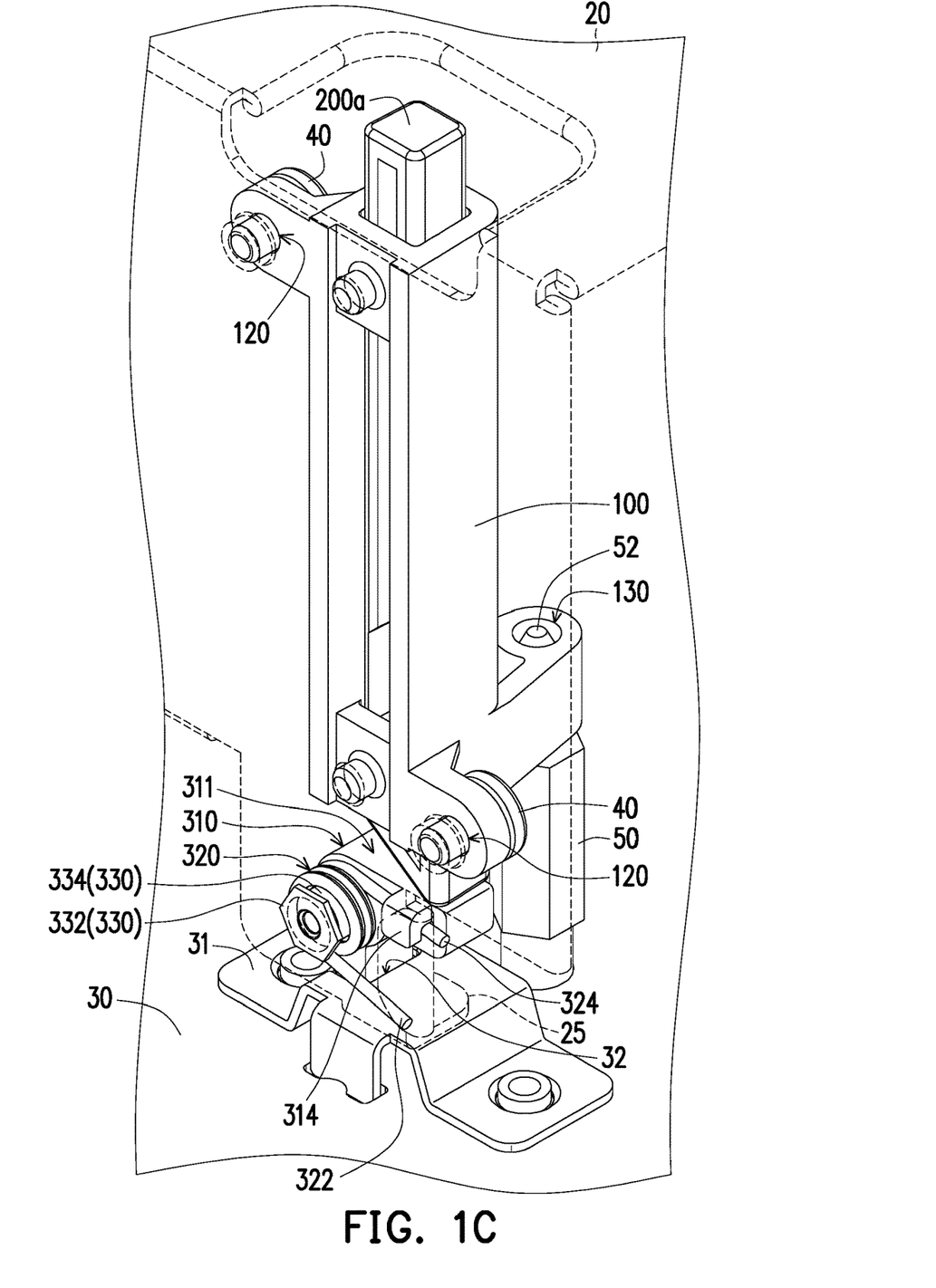
FIG. 1C is a partial three-dimensional perspective diagram of FIG. 1A from still another perspective.
Figure 1D:
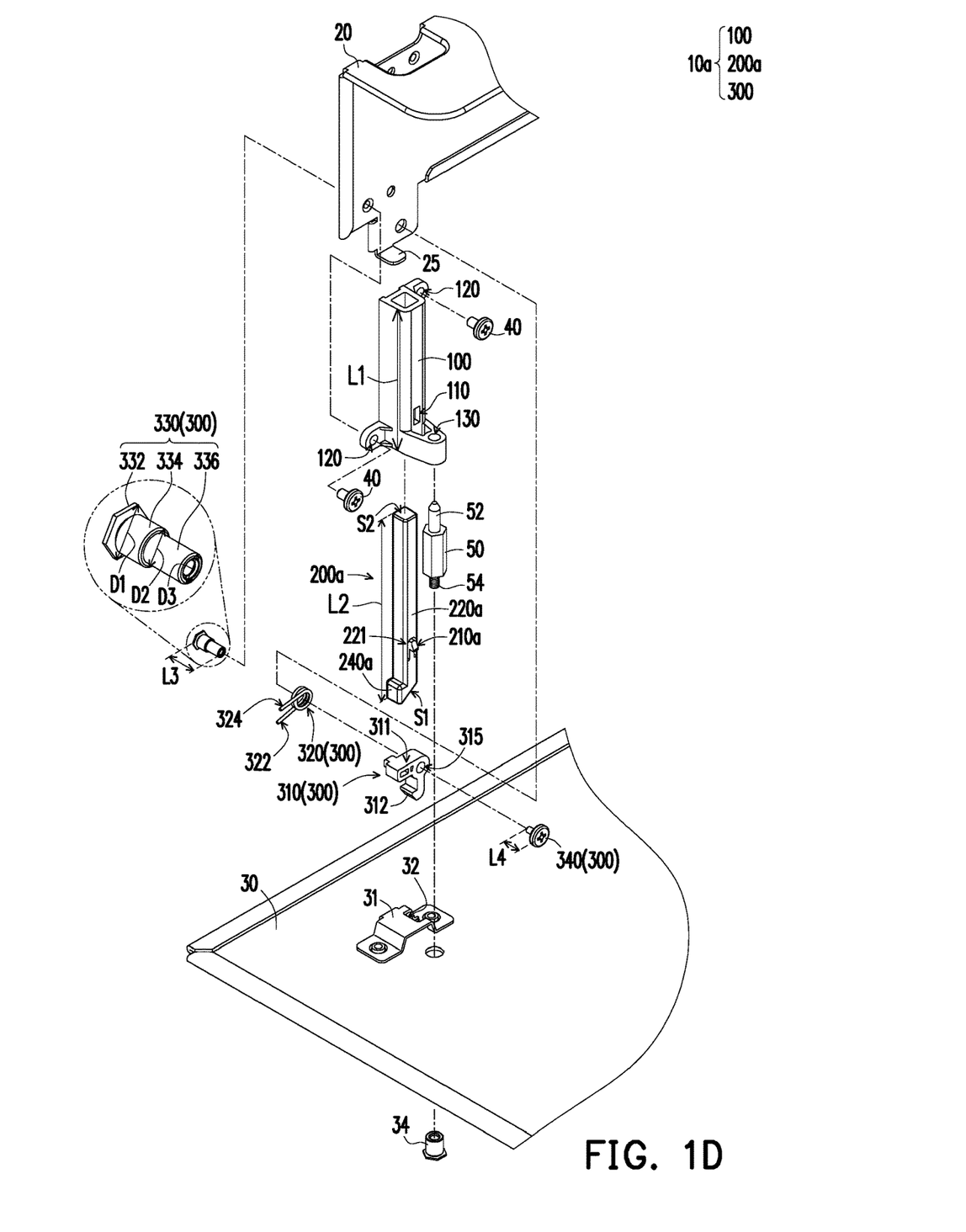
FIG. 1D is a partial three-dimensional exploded view of FIG. 1A.
Figure 1E:
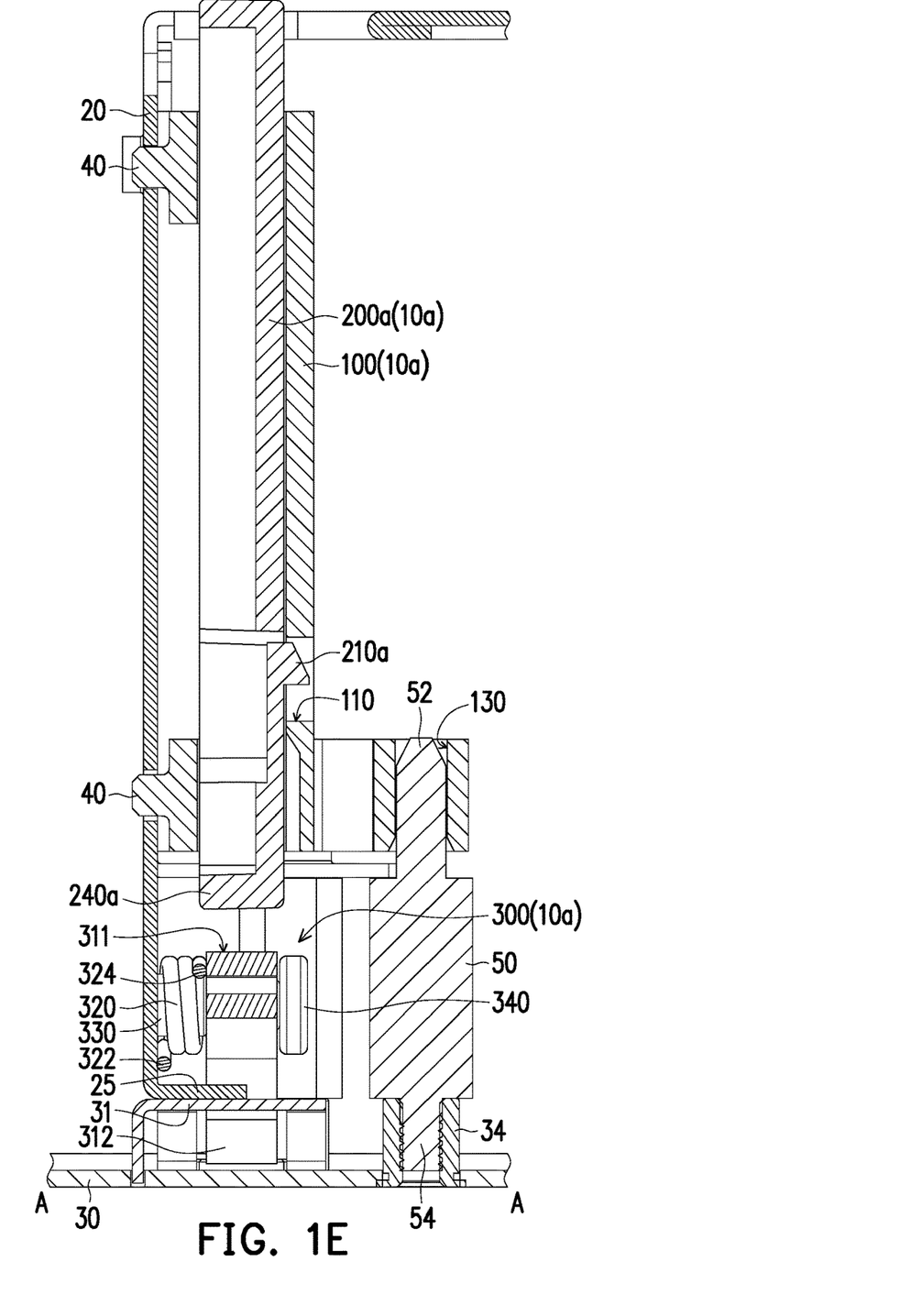
FIG. 1E is a schematic cross-sectional diagram taken along a line A-A of FIG. 1A.
Figure 1F:
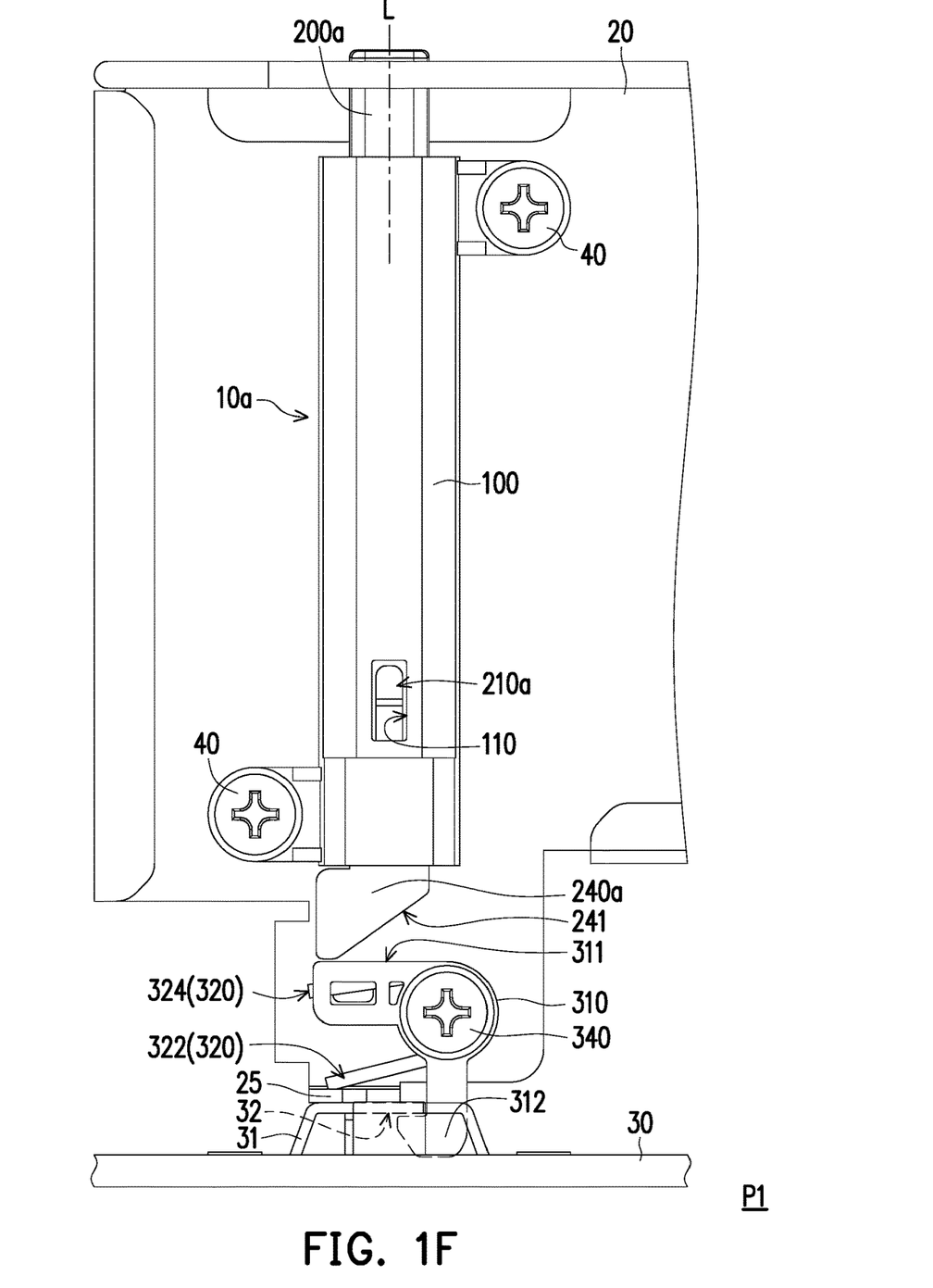
FIG. 1F is a partial side view of FIG. 1A.
Figure 1G:
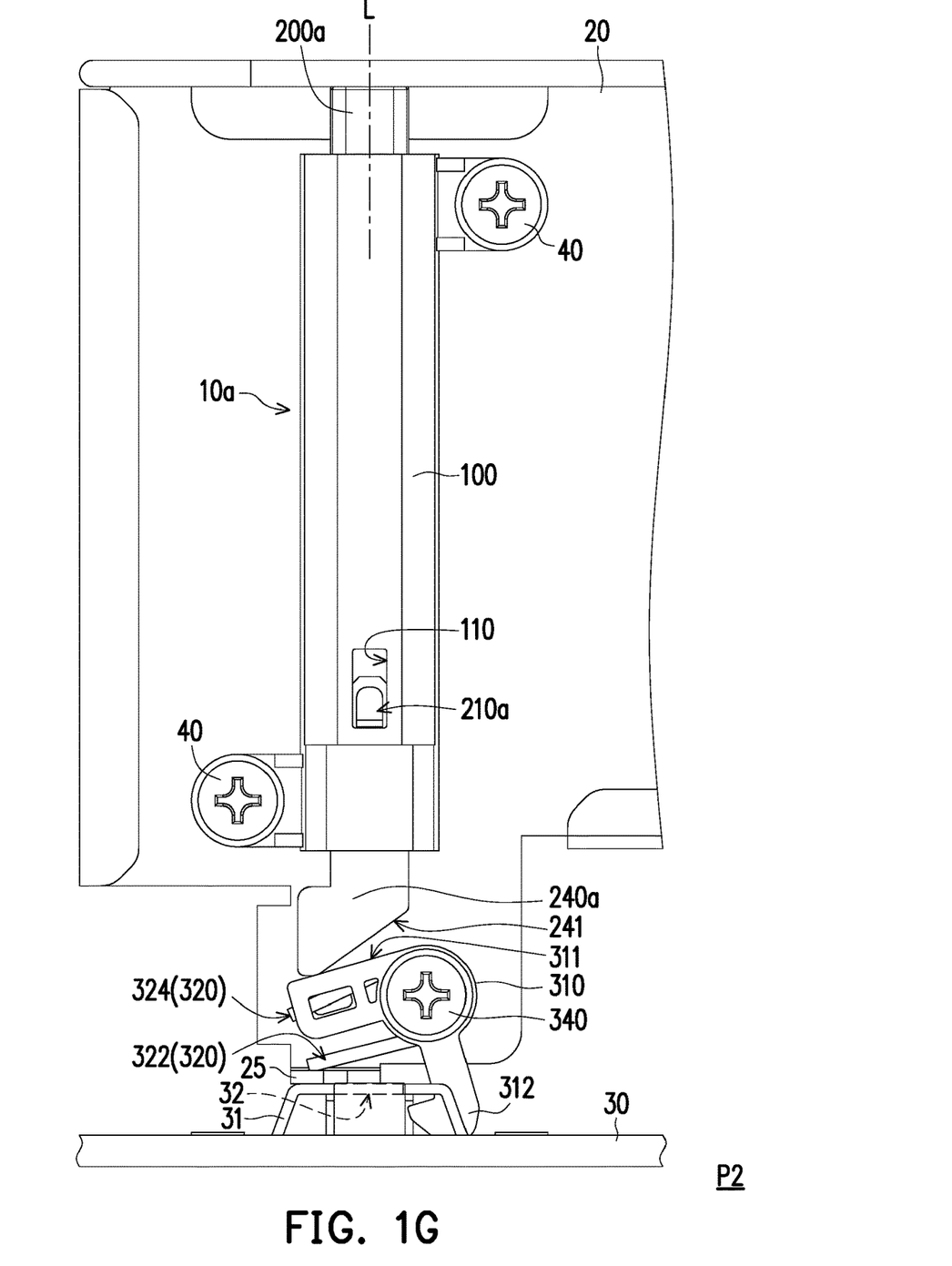
FIG. 1G is a partial side view in which a hook component of FIG. 1A is separated from a positioning opening portion of a second plate.
Figure 1H:
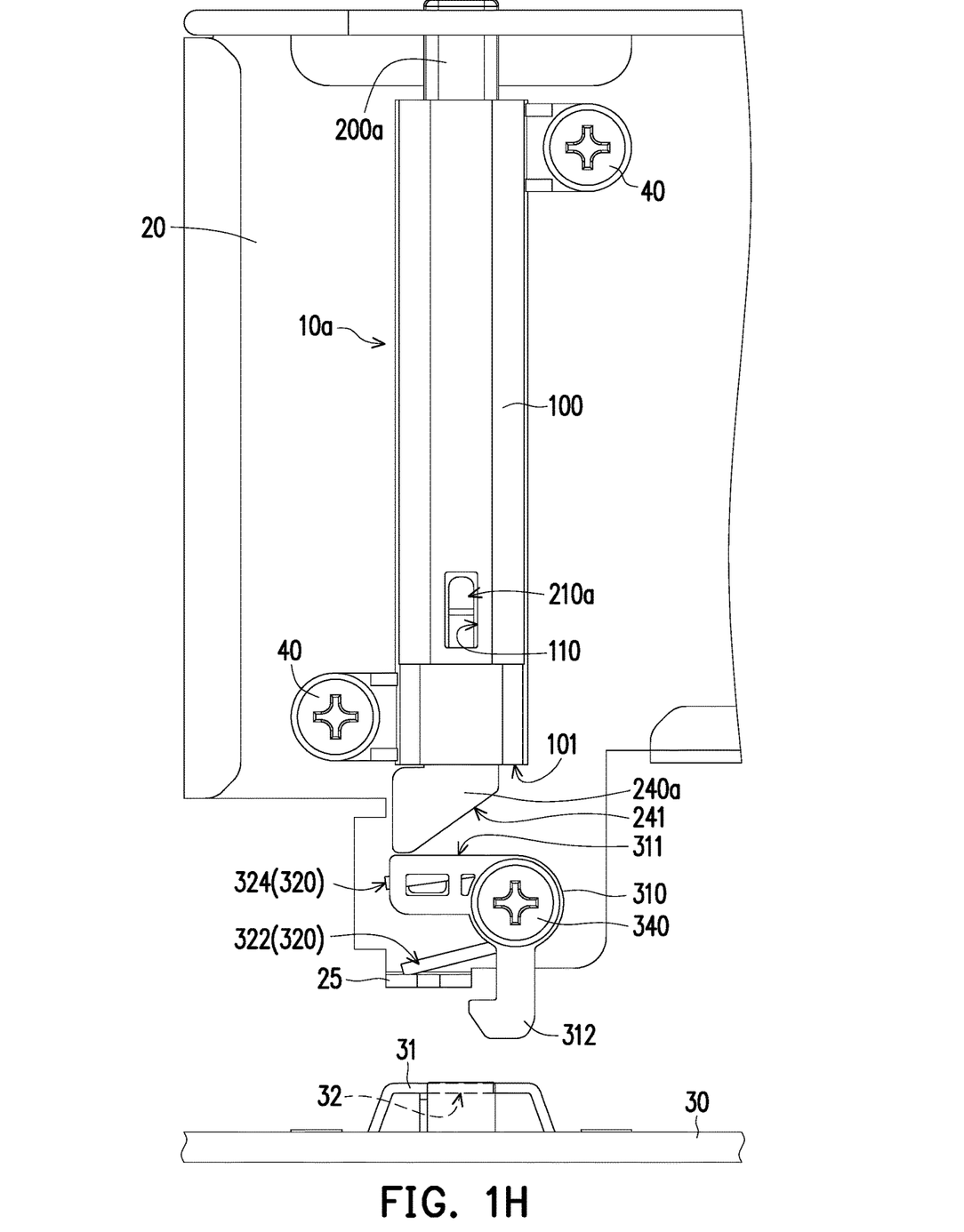
FIG. 1H is a partial side view in which an elastic component of FIG. 1A drives a hook component to restore.

FIG. 1A is a schematic three-dimensional diagram of assembling a first plate on a second plate according to a fastener structure of an embodiment of the invention. FIG. 1B is a schematic partial three-dimensional diagram of FIG. 1A from another perspective. FIG. 1C is a partial three-dimensional perspective diagram of FIG. 1A from still another perspective. FIG. 1D is a partial three-dimensional exploded view of FIG. 1A. FIG. 1E is a schematic cross-sectional diagram taken along a line A-A of FIG. 1A. FIG. 1F is a partial side view of FIG. 1A. FIG. 1G is a partial side view in which a hook component of FIG. 1A is separated from a positioning opening portion of a second plate. FIG. 1H is a partial side view in which an elastic component of FIG. 1A drives a hook component to restore. For convenience of description, a first plate in FIG. 1C is represented by a dotted line, and a guide component and a fixing base are omitted in FIG. 1F, FIG. 1G, and FIG. 1H.

First referring to FIG. 1A, FIG. 1B, and FIG. 1C simultaneously, in the present embodiment, a fastener structure 10a is configured to detachably assemble a first plate 20 on a second plate 30. The first plate 20 is, for example, a case, and the second plate 30 is, for example, a bottom shell of the case, but is not limited thereto. The fastener structure 10a includes a hollow sleeve 100, a rod body 200a, and a hook assembly 300. The hollow sleeve 100 is assembled on the first plate 20. The rod body 200a is inserted into the hollow sleeve 100 and is adapted for moving between a first position P1 (referring to FIG. 1F) and a second position P2 (referring to FIG. 1G) along an axis L. The hook assembly 300 is rotatably assembled on the first plate 20 and includes a hook component 310 and an elastic component 320. The hook component 310 is adapted to fasten a positioning opening portion 32 of the second plate 30, wherein a first side S1 of the rod body 200a is adapted to lean against the hook component 310. The elastic component 320 has a first end 322 and a second end 324 opposite to each other. The first end 322 leans against the first plate 20, and the second end 324 is fixed on the hook component 310.

In detail, referring to FIG. 1B and FIG. 1E, in the present embodiment, a material of the hollow sleeve 100 is, for example, plastic, metal, or a composite material, and a shape of the hollow sleeve 100 is, for example, rectangular. The hollow sleeve 100 includes a first fastening portion 110. A material of the rod body 200a is, for example, plastic, metal, or a composite material, and a shape of the rod body 200a is, for example, rectangular. The rod body 200a includes a second fastening portion 210a. In particular, the first fastening portion 110 is adapted to fasten the second fastening portion 210a to restrict relative movement between the rod body 200a and the hollow sleeve 100. Preferably, one of the first fastening portion 110 and the second fastening portion 210a is a fixture block, and the other of the first fastening portion 110 and the second fastening portion 210a is a slot. Herein, the first fastening portion 110 is embodied as a slot, and the second fastening portion 210a is embodied as a fixture block, but is not limited thereto.

Referring to both FIG. 1B and FIG. 1D, the rod body 200a of the present embodiment has a first side S1 and a second side S2 opposite to each other, and the second fastening portion 210a of the rod body 200a is closer to the first side S1 relative to the second side S2. Further, the rod body 200a includes a body 220a and a leaning portion 240a. The leaning portion 240a is connected to the body 220a and protrudes from a side edge 221 of the body 220a. The leaning portion 240a is fastened to a first side 101 (referring to FIG. 1H) of the hollow sleeve 100, and the leaning portion 240a is adapted for leaning against the hook component 310. As shown in FIG. 1G, the hook component 310 has a leaning surface 311, and the leaning portion 240a has an inclined surface 241. A part of the inclined surface 241 is adapted for directly leaning against the abutting surface 311. In other words, the inclined surface 241 of the leaning portion 240a does not completely lean against the leaning surface 311 of the hook component 310, but only a part of the inclined surface 241 leans against the leaning surface 311.

Herein, a length L2 of the rod body 200a is greater than a length L1 (referring to FIG. 1D) of the hollow sleeve 100, and a mechanism that may restrict relative movement between the rod body 200a and the hollow sleeve 100 is structural interference between the second fastening portion 210a of the rod body 200a and the first fastening portion 110 of the hollow sleeve 100, and structural interference between the leaning portion 240a of the rod body 200a and the first side 101 of the hollow sleeve 100, but is not limited thereto.

Referring to FIG. 1C and FIG. 1D, the hollow sleeve 100 of the present embodiment has a plurality of locking holes 120. A plurality of locking components 40 are adapted to respectively pass through the locking holes 120 to lock the hollow sleeve 100 on the first plate 20. In order to improve accuracy of assembly, referring to FIG. 1E, the hollow sleeve 100 of the present embodiment further has a guide hole 130. One end 52 of a guide component 50 is adapted to pass through the guide hole 130, and the other end 54 of the guide component 50 opposite to the one end 52 is locked on a fixing base 34 of the second plate 30. In assembly, the guide component 50 may be first locked on the fixing base 34 through the other end 54, and then the fastener structure 10a passes through the one end 52 of the guide component 50 through the guide hole 130 of the hollow sleeve 100 to be positioned on the second plate 30.

Next, referring to FIG. 1B, FIG. 1C, and FIG. 1D simultaneously, the hook component 310 of the hook assembly 300 of the present embodiment includes a first hook portion 312 and a second hook portion 314. In detail, a material of the hook component 310 is, for example, plastic, metal, or a composite material, and a shape of the hook component 310 is J-shaped. The first hook portion 312 is adapted to fasten the positioning opening portion 32 of the second plate 30, while a second end 324 of the elastic component 320 is adapted to be fixed on the second hook portion 314. In other words, the first hook portion 312 is configured to fasten the positioning opening portion 32, and the second hook portion 314 is configured to fix the second end 324 of the elastic component 320. The elastic component 320 may be, for example, a spring or a torsion spring. Herein, the elastic component 320 is exemplified by the torsion spring, but is not limited thereto. In addition, the hook component 310 has an assembly hole 315, and the hook assembly 300 further includes a fixing sleeve 330 and a locking component 340. A length L3 of the fixing sleeve 330 is greater than a length L4 of the locking component 340. The fixing sleeve 330 is assembled on the first plate 20 and passes through the assembly hole 315 of the hook component 310. The elastic component 320 is sleeved on the fixing sleeve 330, and the locking component 340 is locked in the fixing sleeve 330 and leans against the hook component 310.

Further, referring to both FIG. 1C and FIG. 1D, the fixing sleeve 330 of the present embodiment includes a fixing portion 332, a disposing portion 334, and a sleeving portion 336. The fixing portion 332 is fixed on the first plate 20, the disposing portion 334 is connected to the fixing portion 332, and the elastic element 320 is sleeved on the disposing portion 334. The elastic component 320 is actually located between the fixing portion 332 and the hook component 310, and the sleeving portion 336 is connected to the disposing portion 334 and passes through the assembly hole 315 of the hook component 310. The disposing portion 334 is located between the fixing portion 332 and the sleeving portion 336, and the locking component 340 is locked in the sleeving portion 336. Herein, the locking component 340 is, for example, a screw or a bolt, but is not limited thereto.

As shown in FIG. 1D, the fixing portion 332, the disposing portion 334, and the sleeving portion 336 of the present embodiment are integrally formed, but are not limited thereto. A first outer diameter D1 of the fixing portion 332 is greater than a second outer diameter D2 of the disposing portion 334, and the second outer diameter D2 of the disposing portion 334 is greater than a third outer diameter D3 of the sleeving portion 336, but are not limited thereto. In addition, in the present embodiment, still referring to FIG. 1C and FIG. 1D, the first plate 20 includes a bent portion 25, and the second plate 30 includes a fixing plate 31. The fixing plate 31 includes the positioning opening portion 32. A first end 322 of the elastic component 320 leans against the bent portion 25 of the first plate 20.

For an action of the fastener structure 10a, referring to FIG. 1F first, when the rod body 200a is located at a first position P1, the bent portion 25 of the first plate 20 leans against the fixing plate 31, and the first hook portion 312 of the hook component 310 is fastened to the positioning opening portion 32 of the fixing plate 31 of the second plate 30. At this time, the first plate 20 is assembled on the second plate 30. Next, referring to both FIG. 1F and FIG. 1G, when an external force is applied to cause the rod body 200a to move (for example, slide) from the first position P1 to the second position P2, the leaning portion 240a of the rod body 200a pushes against the leaning surface 311 of the hook component 310, so that the hook component 310 is rotated by force to be separated from the positioning opening portion 32 of the second plate 30, and the elastic component 320 is elastically deformed due to the rotation of the hook component 310. Finally, referring to FIG. 1H, the first plate 20 can be disassembled from the second plate 30, and an elastic restoring force of the elastic component 320 can drive the hook component 310 to restore. In other words, the hook component 310 of the present embodiment can be regarded as an actuating component, which can rotated by the movement of the rod body 200a relative to the hollow sleeve 100, so that the first hook portion 312 is fastened to or not fastened to the positioning opening portion 32 of the second plate 30, thereby assembling or disassembling the first plate 20 on the second plate 30.

In short, in the design of the fastener structure 10a of the present embodiment, the rod body 200a is inserted into the hollow sleeve 100, and is adapted for moving (e.g., sliding) between the first position P1 and the second position P2 along the axis L, so as to apply or not apply the force to the hook assembly 300, thereby assembling or disassembling the first plate 20 on the second plate 30. Therefore, the fastener structure 10a of the present embodiment quickly assembles or disassembles the first plate 20 and the second plate 30 depending on structural interference, and has characteristics of simple operation and tool-less mounting. In addition, the fastener structure 10a of the present embodiment includes the hollow sleeve 100, the rod body 200a, and the hook assembly 300, so that the fastener structure 10a of the present embodiment further has advantages of simple design and a simple structure.

It should be noted herein that in the following embodiments, reference numerals and some content of the foregoing embodiments are used, and same reference numerals are used to represent same or similar elements, and descriptions about same technical content are omitted. Reference may be made to the foregoing embodiments for the omitted portion, and the descriptions thereof are omitted in the following embodiments.

Figure 2A:
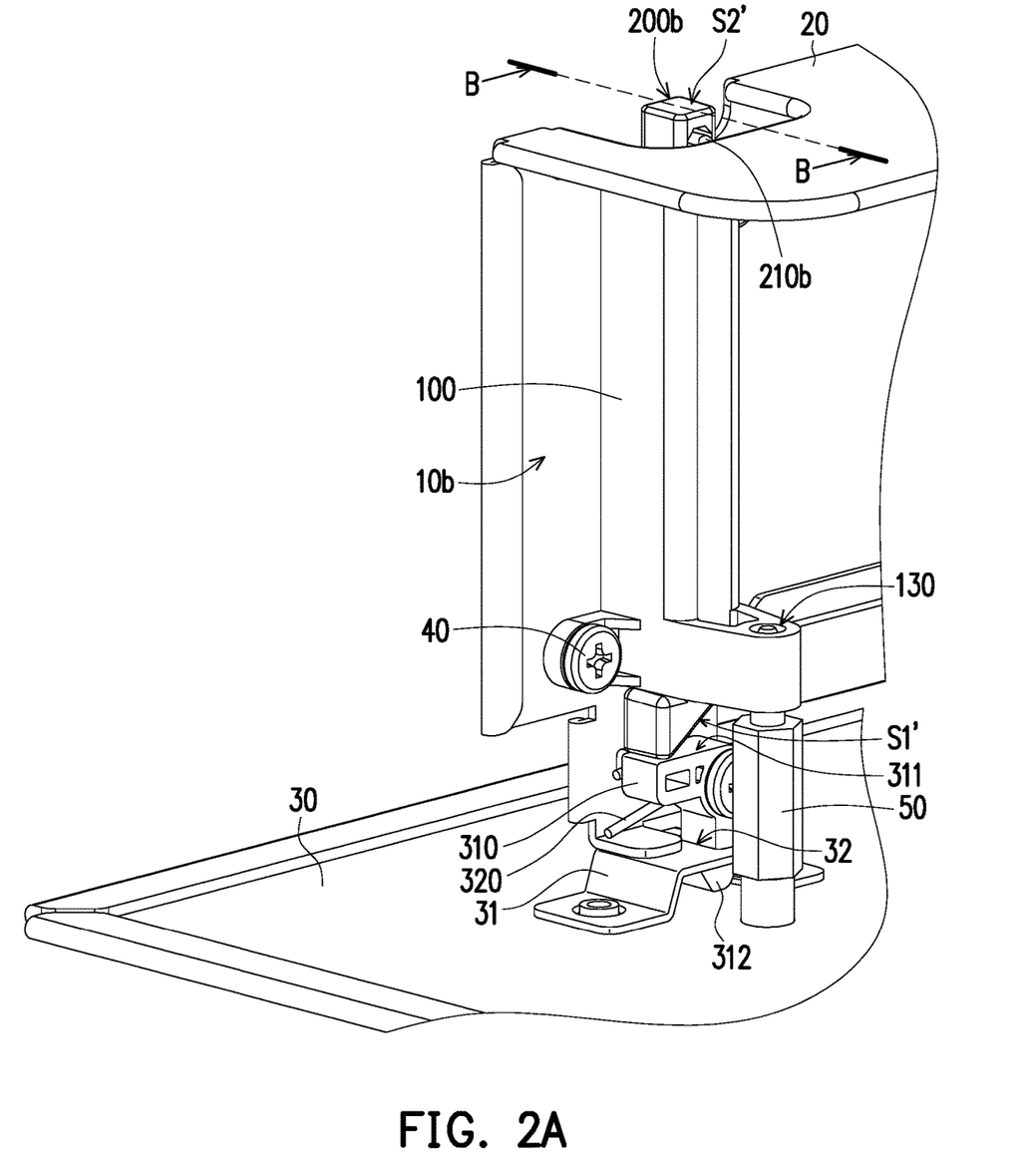
FIG. 2A is a schematic partial three-dimensional diagram of assembling a first plate on a second plate according to a fastener structure of another embodiment of the invention.
Figure 2B:
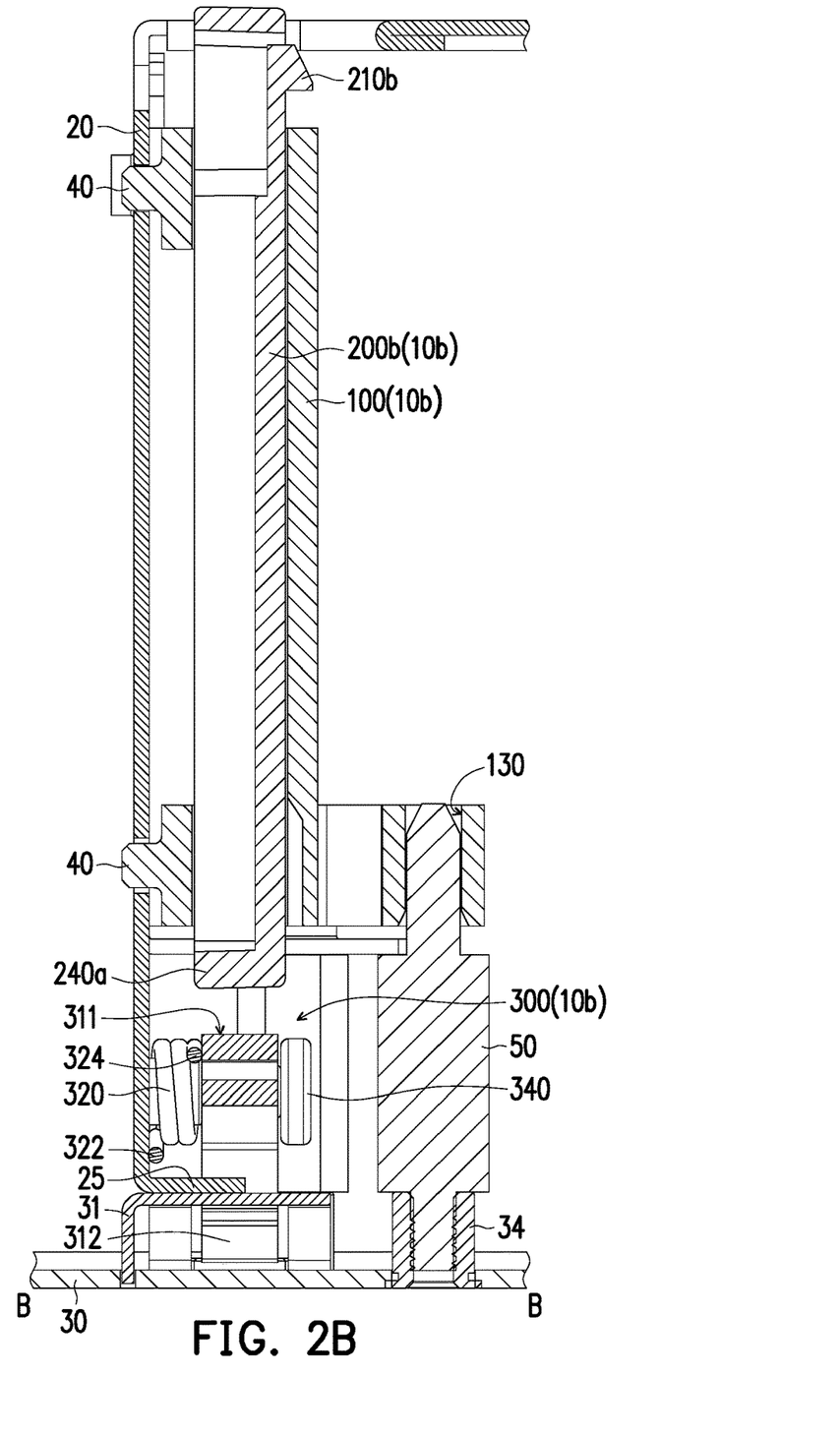
FIG. 2B is a schematic cross-sectional diagram taken along a line B-B of FIG. 2A.
Figure 2C:
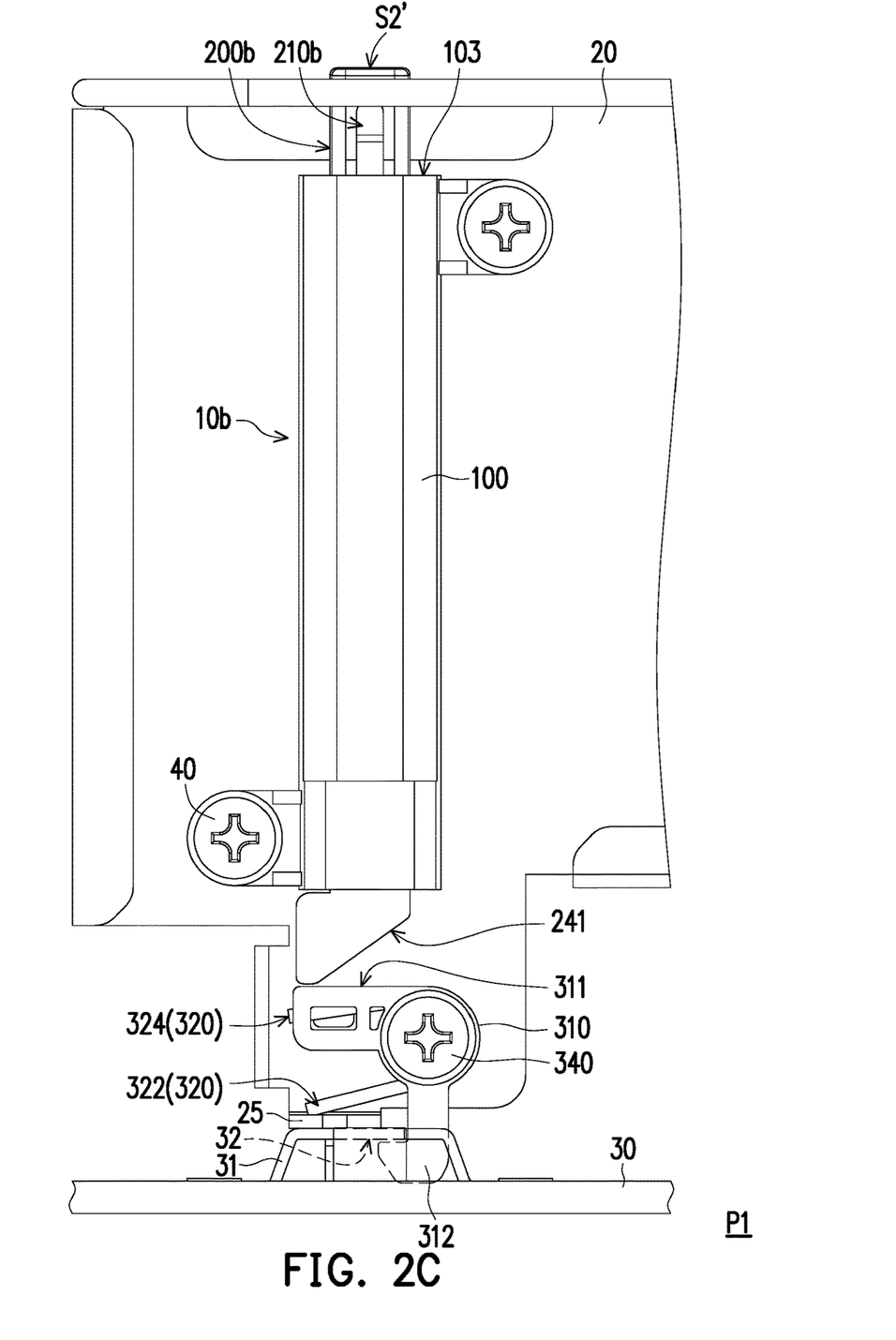
FIG. 2C is a partial side view of FIG. 2A.
Figure 2D:
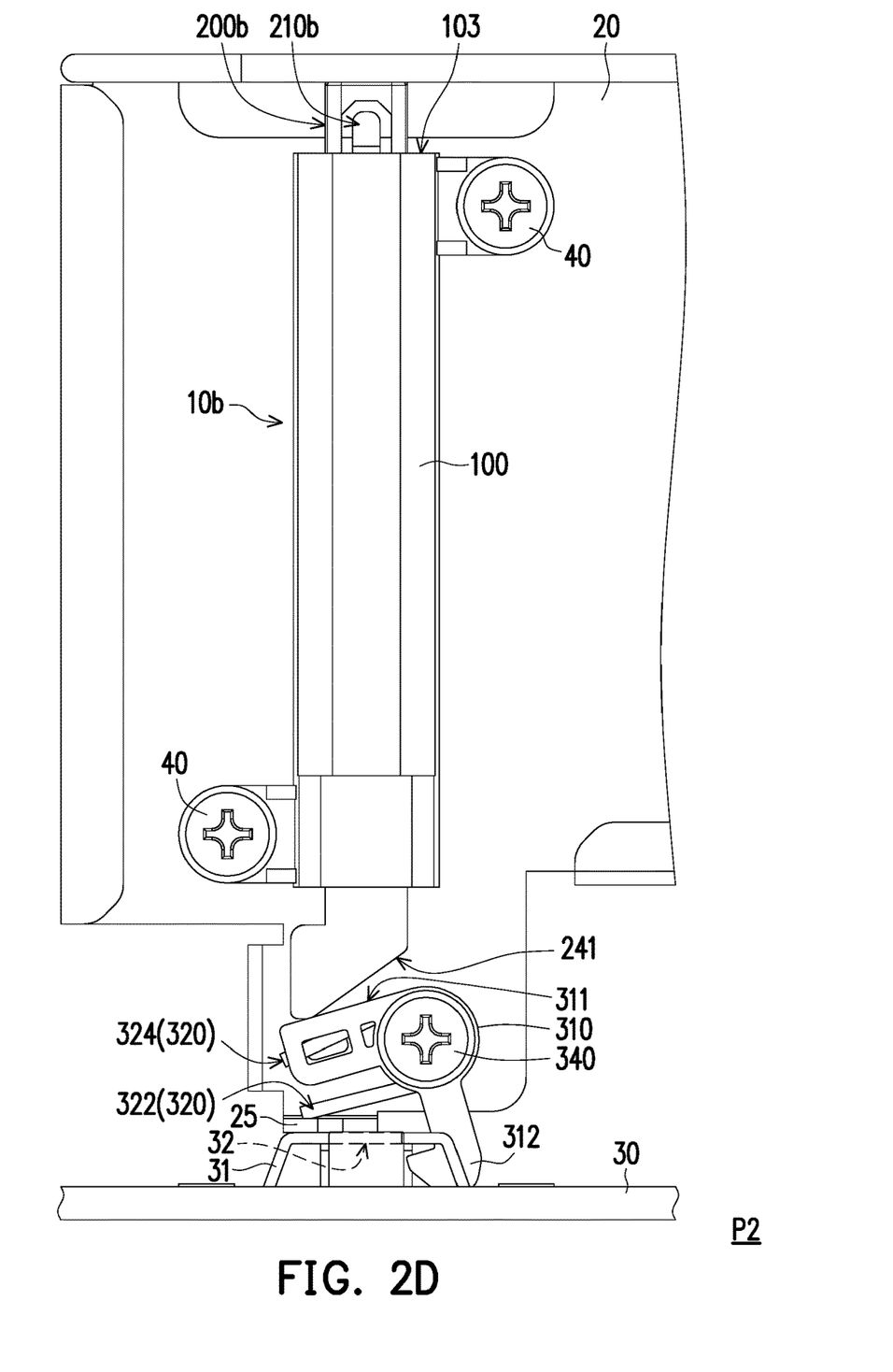
FIG. 2D is a partial side view in which a hook component of FIG. 2A is separated from a positioning opening portion of a second plate.

FIG. 2A is a schematic partial three-dimensional diagram of assembling a first plate on a second plate according to a fastener structure of another embodiment of the invention. FIG. 2B is a schematic cross-sectional diagram taken along a line B-B of FIG. 2A. FIG. 2C is a partial side view of FIG. 2A. FIG. 2D is a partial side view in which a hook component of FIG. 2A is separated from a positioning opening portion of a second plate. For convenience of description, a guide component and a fixing base are omitted in FIG. 2C and FIG. 2D.

First referring to FIG. 1E, FIG. 2A, and FIG. 2B simultaneously, a fastener structure 10b of the present embodiment is similar to the fastener structure 10a of FIG. 1E, and a difference between the two fastener structures is: a rod body 200b of the present embodiment has a first side S1' and a second side S2' opposite to each other, and the rod body 200b includes a fastening component 210b, wherein the fastening component 210b is disposed on the second side S2' and adapted to fasten one side (that is, a second side 103, referring to FIG. 2D) of the hollow sleeve 100. Herein, the fastening component 210b is embodied as a fixture block, but is not limited thereto.

For an action of the fastener structure 10b, referring to FIG. 2C first, when the rod body 200b is located at the first position P1, the bent portion 25 of the first plate 20 leans against the fixing plate 31, and the hook component 310 is fastened to the positioning opening portion 32 of the fixing plate 31 of the second plate 30. At this time, the first plate 20 is assembled on the second plate 30. Afterwards, referring to both FIG. 2C and FIG. 2D, when an external force is applied to cause the rod body 200b to move (for example, slide) from the first position P1 to the second position P2, the rod body 200b pushes against the hook component 310, so that the hook component 310 is rotated to be separated from the positioning opening portion 32 of the second plate 30, and the elastic component 320 is elastically deformed due to the rotation of the hook component 310. Finally, the first plate 20 can be disassembled from the second plate 30, and the elastic restoring force of the elastic component 320 can drive the hook component 310 to restore.

Based on the foregoing, in the design of the fastener structure of the invention, the rod body is inserted into the hollow sleeve and is adapted for moving between the first position and the second position along the axis to apply or not apply a force to the hook assembly, thereby assembling or disassembling the first plate on the second plate. In short, the fastener structure of the invention quickly assembles or disassembles the first plate and the second plate depending on structural interference, and has characteristics of simple operation and tool-less mounting. In addition, the fastener structure of the invention has the advantages of simple design and a simple structure.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A fastener structure configured to detachably assemble a first plate on a second plate, the fastener structure comprising:
    a hollow sleeve assembled on the first plate;
    a rod body inserted into the hollow sleeve and adapted for moving between a first position and a second position along an axis; and
    a hook assembly rotatably assembled on the first plate, and comprising:
        a hook component adapted for being fastened to a positioning opening portion of the second plate, wherein a first side of the rod body is adapted to lean against the hook component; and
        an elastic component having a first end and a second end opposite to each other, wherein the first end leans against the first plate, and the second end is fixed on the hook component, wherein
    when the rod body is located at the first position, the hook component is fastened to the positioning opening portion of the second plate, and when the rod body moves from the first position to the second position, the rod body pushes against the hook component to rotate the hook component to be separated from the positioning opening portion of the second plate, and the elastic component is elastically deformed, an elastic restoring force of the elastic component drives the hook component to restore,
    wherein the hollow sleeve has a guide hole, and two opposite ends of a guide component are respectively adapted to pass through the guide hole and lock a fixing base of the second plate.

2. The fastener structure according to claim 1, wherein the hollow sleeve comprises a first fastening portion, and the rod body comprises a second fastening portion, the first fastening portion is fastened to the second fastening portion to restrict relative movement between the rod body and the hollow sleeve.

3. The fastener structure according to claim 2, wherein one of the first fastening portion and the second fastening portion is a fixture block, and the other of the first fastening portion and the second fastening portion is a slot.

4. The fastener structure according to claim 2, wherein the rod body has the first side and a second side opposite to each other, and the second fastening portion is closer to the first side relative to the second side.

5. The fastener structure according to claim 1, wherein the rod body has the first side and a second side opposite to each other and comprises a fastening component, the fastening component is disposed on the second side and adapted to fasten in a side of the hollow sleeve.

6. The fastener structure according to claim 5, wherein the fastening component is a fixture block.

7. The fastener structure according to claim 1, wherein the hollow sleeve has a plurality of locking holes, a plurality of locking components are adapted to respectively pass through the locking holes to lock the hollow sleeve on the first plate.

8. The fastener structure according to claim 1, wherein the rod body comprises a body and a leaning portion, the leaning portion is connected to the body and protrudes from a side edge of the body, and the leaning portion is adapted for leaning against the hook component.

9. The fastener structure according to claim 8, wherein the hook component has a leaning surface, and the leaning portion has an inclined surface, a part of the inclined surface is adapted for directly leaning against the leaning surface.

10. The fastener structure according to claim 1, wherein the hook component comprises:
    a first hook portion adapted for being fastened to the positioning opening portion of the second plate; and
    a second hook portion on which the second end of the elastic component is fixed.

11. The fastener structure according to claim 1, wherein the hook component has an assembly hole, and the hook assembly further comprises:
   a fixing sleeve assembled on the first plate and passing through the assembly hole of the hook component, wherein the elastic component is sleeved on the fixing sleeve; and
   a locking component locked in the fixing sleeve and leaning against the hook component.

12. The fastener structure according to claim 11, wherein the fixing sleeve comprises:
   a fixing portion fixed on the first plate;
   a disposing portion connected to the fixing portion, the elastic component being sleeved on the disposing portion, wherein the elastic component is located between the fixing portion and the hook component; and
   a sleeving portion connected to the disposing portion and passing through the assembly hole of the hook component, wherein the disposing portion is located between the fixing portion and the sleeving portion, and the locking component is locked in the sleeving portion.

13. The fastener structure according to claim 12, wherein a first outer diameter of the fixing portion is greater than a second outer diameter of the disposing portion, and the second outer diameter of the disposing portion is greater than a third outer diameter of the sleeving portion.

14. The fastener structure according to claim 12, wherein the fixing portion, the disposing portion, and the sleeving portion are integrally formed.

15. The fastener structure according to claim 11, wherein a length of the fixing sleeve is greater than a length of the locking component.

16. The fastener structure according to claim 11, wherein the locking component comprises a screw or a bolt.

17. The fastener structure according to claim 1, wherein the elastic component comprises a spring or a torsion spring.

18. The fastener structure according to claim 1, wherein a length of the rod body is greater than a length of the hollow sleeve.

19. The fastener structure according to claim 1, wherein the first plate comprises a bent portion, and the second plate comprises a fixing plate, the fixing plate comprises the positioning opening portion, the first end of the elastic component leans against the bent portion, and when the rod body is located at the first position, the bent portion leans against the fixing plate, and the hook component is fastened to the positioning opening portion.

* * * * *